(12) United States Patent
Nakashimo

(10) Patent No.: US 6,373,227 B2
(45) Date of Patent: Apr. 16, 2002

(54) CHARGING AND DISCHARGING CONTROL CIRCUIT AND CHARGING TYPE POWER SUPPLY DEVICE

(75) Inventor: Takao Nakashimo, Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/778,458

(22) Filed: Feb. 7, 2001

(30) Foreign Application Priority Data

Mar. 30, 2000 (JP) .......................................... 2000-93513

(51) Int. Cl.[7] ............................................. H01M 10/46
(52) U.S. Cl. ...................................... 320/134; 320/136
(58) Field of Search ................................. 320/127, 128, 320/134, 136, 137

(56) References Cited

U.S. PATENT DOCUMENTS 6,052,016 A * 4/2000 Sugiura et al. ............. 327/393
6,111,388 A * 8/2000 Mukainakano ............. 320/134
6,181,108 B1 * 1/2001 Sudo et al. .................. 320/134

* cited by examiner

Primary Examiner—Edward H. Tso
(74) Attorney, Agent, or Firm—Adams & Wilks

(57) ABSTRACT

In a charging and discharging control circuit that controls the charging and discharging operation of a secondary battery and a charging type power supply device for the secondary battery which includes the charging and discharging control circuit therein, there is provided a charging and discharging control circuit that enters a test mode where the delay time of the internal control circuit is shortened when a voltage equal to or higher than a regulated voltage is applied to the charger connection terminal of a charging type power supply device.

2 Claims, 3 Drawing Sheets

CHARGING AND DISCHARGING CONTROL CIRCUIT AND CHARGING TYPE POWER SUPPLY DEVICE

BACKGROUND OF THE INVENTION

1. Field of the Invention

The present invention relates to a charging and discharging control circuit that controls the charging and discharging operation of a secondary battery and a charging type power supply device for the secondary battery which includes the charging and discharging control circuit therein.

2. Description of the Related Art

As a conventional charging type power supply device for a secondary battery, there has been known a power supply device shown in a circuit block diagram of FIG. 5. For example, Japanese Patent Application Laid-opn No. Hei 4-75430 "charging type power supply device" discloses the structure of the above power supply device. That is, an external terminal −V0 or +V0 is connected with a secondary battery 101 through a switching circuit 102. Also, a charging and discharging control circuit 110 is connected in parallel with the secondary battery 101. The charging and discharging control circuit 110 has a function of detecting a voltage across the secondary battery 101. In the case where the secondary battery is in an over-charge state (a state where the battery is higher than a given voltage value, hereinafter referred to as "over-charge protective state") or an over-discharge state (a state where the battery is lower than the given voltage value, hereinafter referred to as "over-discharge protective state"), a signal is outputted from the charging and discharging control circuit 110 so that the switching circuit 102 turns off. Also, when the external terminal +VO reaches a certain voltage, the switching circuit 102 turns off, and the discharging operation stops, thereby being capable of limiting a current that flows in the switching circuit 102.

In other words, the discharging operation can stop (over-current control) when an excessive current flows in the switching circuit 102. Hereinafter, this state is called "over-current protective state". The charging and discharging control circuit serves to protect the battery from those states.

For example, the following structure is generally applied. That is, in the case of controlling the charging and discharging operation of a lithium ion battery, in order to protect the lithium ion battery from being over-charged, when it is detected that a terminal voltage is equal to or higher than a given level, the switching element of the switching circuit turns off after a given period of time given by a delay circuit to inhibit the charging operation.

As a result, the over-charge state is positively detected without responding to a transitional change in a battery voltage, and the operation of charging the secondary battery is controlled so that the secondary battery is not brought into the over-charge state. In addition, in the charging and discharging control circuit, a control for stopping to supply a current from the secondary battery to a load while the over-discharge is detected and a control for stopping to supply a current from the secondary battery to the load while an over-current from the secondary battery to the load is detected are conducted likewise. In those controls, a delay circuit is used for each of those controls for the same reason. For example, in the case of controlling the charging and discharging operation of the lithium ion battery, a delay time of several hundreds mS to several S is required.

However, in case of the charging and discharging control circuit including the delay circuit therein, there is a case in which a terminal that enables the delay time to be changed from the external cannot be prepared due to the limit of the number of terminals of the circuit. In this case, when the over-charge detection voltage and the over-discharge detection voltage are examined, an output signal is not outputted until time periods, which are equal to or longer than the respective delay times, elapse in the respective examinations. In order to recognize the output signal, the time periods, which are equal to or longer than the respective delay times, need to elapse, with the result that the examination period of time of the charging and discharging control circuit is elongated, and the circuit manufacturing costs may be increased.

SUMMARY OF THE INVENTION

The present invention has been made to solve the above problem inherent in the prior art, and therefore an object of the present invention is to enable a period of time of examination to be reduced and the manufacturing costs to reduce by entering a test mode of shortening a delay time of an internal control circuit in the case where a voltage equal to or higher than a regulated value is applied to a charger connection terminal of a charging type power supply device.

In order to achieve the above object, according to the present invention, there is provided a charging and discharging control circuit, comprising: over-charge voltage detecting means, over-discharge voltage detecting means or over-current voltage detecting means for a secondary battery; an internal control circuit which inputs and processes signals from said over-charge voltage detecting means, said over-discharge voltage detecting means or said over-current voltage detecting means and outputs a signal for controlling the charging and discharging operation; and a delay circuit that inputs the output of said control signal and outputs a signal after a constant delay time; wherein a delay time of said delay circuit is shortened when a voltage equal to or higher than a regulated voltage is applied to the charging connection terminal.

Also, according to the present invention, there is provided charging and discharging control device, comprising: a secondary battery connected to an external power supply terminal through a switching circuit; and a charging and discharging control circuit including over-charge voltage detecting means, over-discharge voltage detecting means or an over-current detecting circuit, an internal control circuit, a delay circuit and a current control switching circuit for controlling said switching circuit; wherein a delay time of said delay circuit is shortened when a voltage equal to or higher than a regulated voltage is applied to the charging connection terminal.

BRIEF DESCRIPTION OF THE DRAWINGS

These and other objects, features and advantages of this invention will become more fully apparent from the following detailed description taken with the accompanying drawings in which.

DETAILED DESCRIPTION OF THE PREFERRED EMBODIMENTS

Now, a description will be given in more detail of a preferred embodiment of the present invention with reference to the accompanying drawings.

Figure 1:
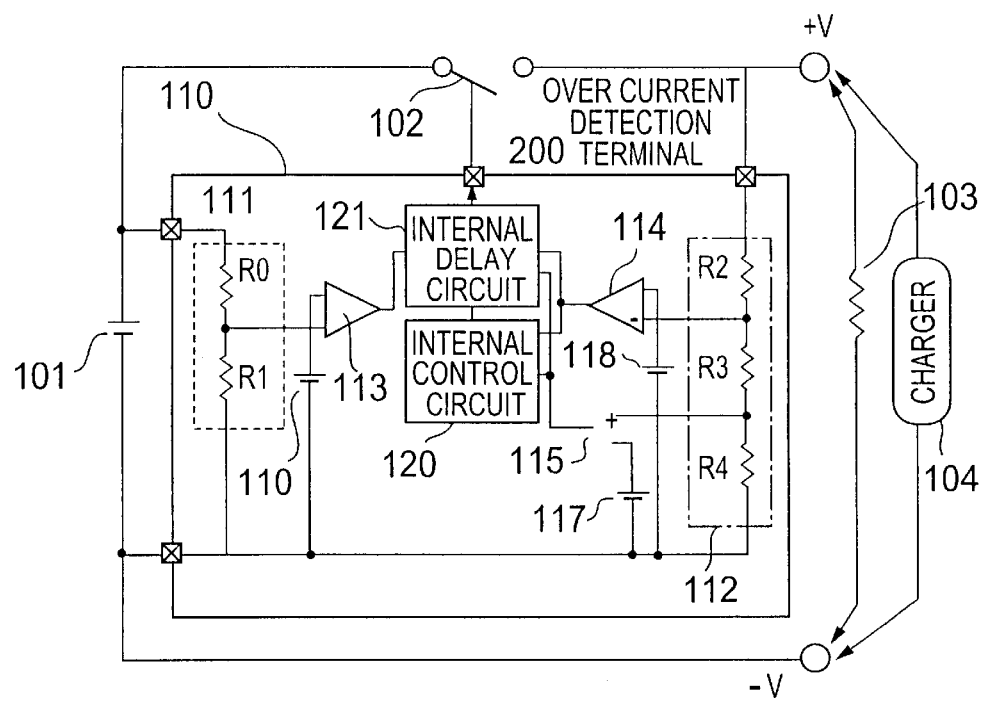
FIG. 1 is an explanatory diagram showing a circuit block of a charging type power supply device in accordance with the present invention.

FIG. 1 is a block diagram showing a charging type power supply device including a charging and discharging control circuit in accordance with the present invention. Hereinafter, an embodiment of the present invention will be described with reference to FIG. 1. The circuit diagram of FIG. 1 only shows an over-charge detecting circuit. An external power supply terminal +V0 is connected with a positive pole of a secondary battery 101 through a switching circuit 102. The voltage acrossing the secondary battery 101 is detected by the charging and discharging control circuit 110, and the switching circuit 102 is ON/OFF controlled in response to the detection results.

The charging and discharging control circuit 110 includes a reference voltage circuit 116 for supplying a given reference voltage Vr to an input terminal of an over-charge detection comparator 113, a voltage dividing circuit 111 formed of resistors R0 and R1 for dividing the terminal voltage of the secondary battery 101, a voltage dividing circuit 112 formed of resistors R2, R3 and R4 for dividing an over-current detection terminal voltage, reference voltage circuits 117 and 118 for giving a given reference voltage Vr to the input terminals of the voltage detection comparators 114 and 115, an internal control circuit 120 and an internal delay circuit 121. The over-current detection terminal is connected between the switching circuit 102 and the charger connection terminal.

The switch circuit 102 is controlled by an output of the charging and discharging control circuit 110. A charger 104 for charging the secondary battery 101 and a load 103, to which the secondary battery 101 supplies a current, are connected between the external power supply terminals +V0 and −V0.

The over-charge detection comparator 113 compares the divided voltage output resulting from dividing the terminal voltage of the secondary battery 101 by the resistors R0 and R1 of the voltage dividing circuit 111 with a reference voltage Vr of the reference voltage circuit 116 to detect the over-charge state. The over-charge detection comparator 113 outputs a high level when the level of the divided output voltage inputted to its positive phase input terminal is larger than the reference voltage Vr.

The voltage detection comparators 114 and 115 compares the divided voltage output resulting from dividing the over-current detection terminal voltage by the resistors R2, R3 and R4 of the voltage dividing circuit 112 with the reference voltage Vr of the reference voltage circuits 117 and 118 to detect the voltage. The voltage detection comparator 114 outputs a low level when the level of the divided output voltage inputted to its inverse phase input terminal is larger than the reference voltage Vr. The voltage detection comparator 115 outputs a high level when the level of the divided output voltage inputted to its positive phase input terminal is larger than the reference voltage Vr.

The internal control circuit 120 inputs the outputs of the over-charge detection comparator 113 and the voltage detection comparators 114 and 115 as input signals and outputs a signal to the internal delay circuit 121. The internal delay circuit 121 inputs the output of the internal control circuit 120 as an input signal and outputs a signal that controls the switching circuit 102 after a regulated delay time.

In the over-charge state, the over-charge detection comparator 113 outputs a high level, and the internal control circuit 120 outputs a control signal to the internal delay circuit 121. The internal delay circuit 121 inputs the output voltage as an input signal and outputs a signal that controls the switching circuit 102 after a regulated delay time t1.

When the voltage of the over-current detection terminal becomes equal to or higher than the regulated voltage V1, the output of the voltage detection comparator 115 becomes high level. The internal control circuit 120 becomes in a state of outputting a control signal for shortening a delay time of the internal delay circuit 121 when the output of the voltage detection comparator 115 becomes high level, and holds that state. In the over-charge state, the over-charge detection comparator 113 outputs high level, and the internal control circuit 120 outputs the control signal to the internal delay circuit 121. The internal delay circuit 121 inputs the output voltage as an input signal and outputs a signal that controls the switching circuit 102 after a regulated delay time t2. For that reason, once the over-current detection terminal becomes a voltage V1 equal to or higher than the regulated voltage, the delay time is maintained short. Thereafter, in a state where the over-charge delay time is short, the over-charge detection voltage can be measured.

When the voltage of the over-current detection terminal becomes equal to or lower than the regulated voltage V2, the output of the voltage detection comparator 114 becomes high level. The internal control circuit 120 cancels the state of outputting the control signal for shortening the delay time of the internal delay circuit 121 when the output of the voltage detection comparator 114 becomes high level, and sets a normal delay time t1. Therefore, once the over-current detection terminal becomes the voltage V2 equal to or lower than the regulated voltage, the internal control circuit 120 cancels the test mode and becomes in a normal state. With this circuit structure, in the case where a charger having an abnormal high voltage is connected and the voltage of the over-current detection terminal becomes equal to or higher than the regulated voltage V1, the switching circuit 102 can be turned off assuming that the abnormal charger is connected. In this case, the delay time of the charging and discharging control circuit 110 becomes short, and a period of time during which a high voltage is applied to the secondary battery 101 can be shortened so as to protect the secondary battery 101.

Figure 2:
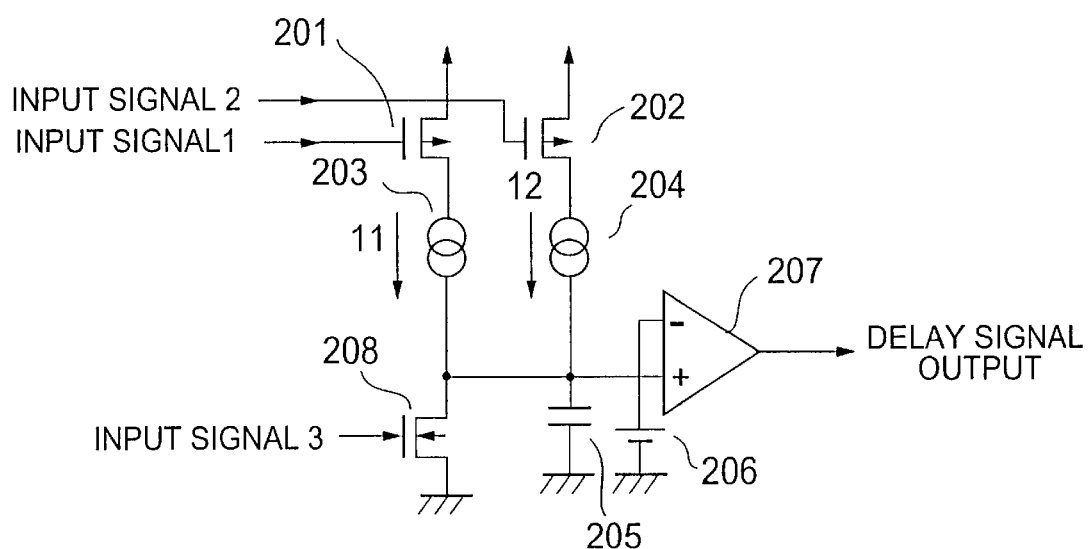
FIG. 2 is an explanatory diagram showing an example of a delay circuit employed in the present invention.

An example of the internal delay circuit will be described with reference to FIG. 2. The constant current sources 203 and 204 supply currents i1 and i2, respectively. The current values of i1 and i2 are different so that i2 is larger than i1. The Pch transistors 201 and 202 change over the on/off state by input signals 1 and 2, respectively. The internal delay circuit controls which of the Pch transistors 201 and 202 should be turned on/off. The Nch transistor discharges a capacitor 205 if no delay time is required and makes the output of the voltage detection comparator 207 low in level.

In the normal state, upon the detection of the over-charge, the internal control circuit outputs to the internal delay circuit a control signal that turns off the Nch transistor, turns on the Pch transistor 201 and turns off the Pch transistor 202. The capacitor 205 is charged with the time constant current i1, and a voltage rises. When the voltage acrossing the capacitor 205 exceeds the output voltage Vr of the reference voltage source 206, the output of the voltage detection comparator 207 becomes high level. This sinal controls the switching circuit. At this time, the delay time becomes $$t1 = CVr/i1.$$

When the voltage of the over-current detection terminal is equal to or higher than the regulated voltage V1, the internal control circuit 120 becomes the test mode where the delay time is short. In this situation, upon the detection of the over-charge, the internal control circuit 120 outputs to the internal delay circuit a control signal that turns off the Nch transistor, turns on the Pch transistor 202 and turns off the Pch transistor 201. The capacitor 205 is charged with the time constant current i2, and the voltage rises. When the voltage acrossing the capacitor 205 exceeds the output voltage Vr of the reference voltage source 206, the output of the voltage detection comparator 207 becomes high level. This signal allows the switching circuit to turn off. At this time, the delay time becomes $$t2 = CVr/i2.$$

In this case, t1>t2 is satisfied, and the delay time can be changed over.

The above description is an example of the delay circuit, and in a delay circuit made up of a clock frequency generating circuit and a counter, the number of counts in a counter is changed over, thereby being capable of changing over the delay time.

Figure 3:
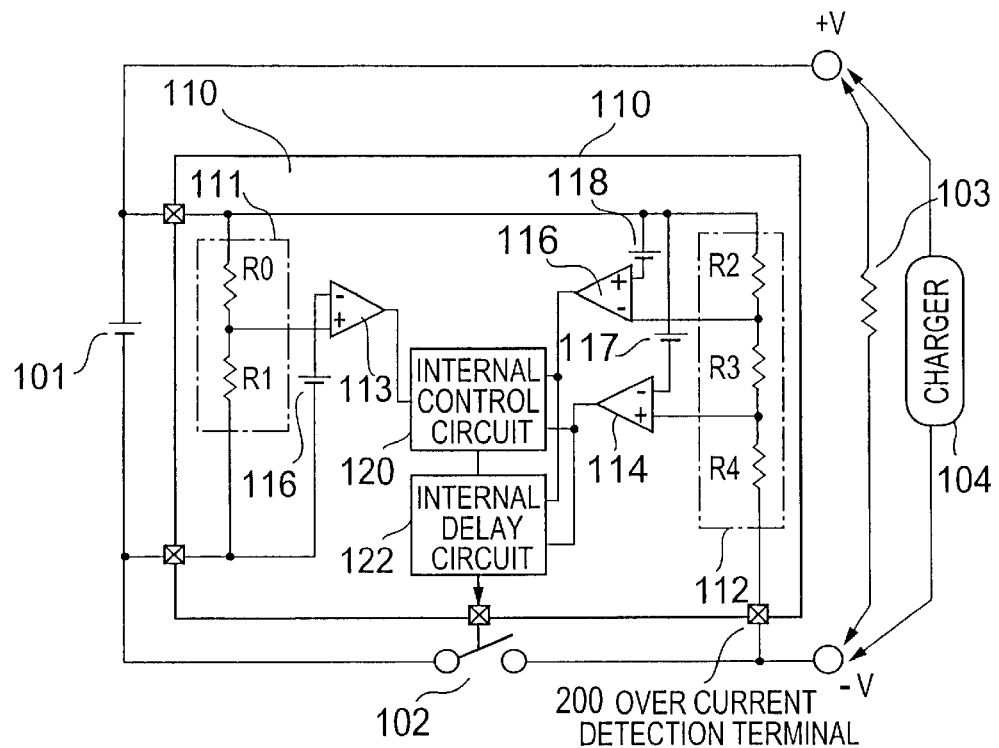
FIG. 3 is an explanatory diagram showing another circuit block of the charging type power supply device in accordance with the present invention.

Also, a delay circuit which can change over the delay time by another means may be used. Further, a switch can be disposed at the VSS side to structure the charging type power supply device as shown in FIG. 3.

In this case, when the voltage of the over-current detection terminal becomes equal to or lower than the regulated voltage V1, the output of the voltage detection comparator 115 becomes high level. When the internal control circuit 120 becomes in a control state where the delay time of the internal delay circuit 121 is shortened and maintains that state when the output of the voltage detection comparator 115 becomes high level. For that reason, once the over-current detection terminal becomes the voltage V1 equal to or lower than the regulated voltage, the delay time is maintained short. Thereafter, the over-charge detection voltage can be measured in a state where the over-charge delay time is short.

When the voltage of the over-current detection terminal is equal to or higher than the regulated voltage V2, the output of the voltage detection comparator 114 becomes high level. The internal control circuit 120 cancels the control state where the delay time of the internal delay circuit 121 is short when the output of the voltage detection comparator 114 becomes high level, and sets the normal delay time t1. For that reason, once the over-current detection terminal becomes the voltage V2, which is equal to or higher than the regulated voltage, the internal control circuit 120 cancels the test mode and becomes in the normal state.

Figure 4:
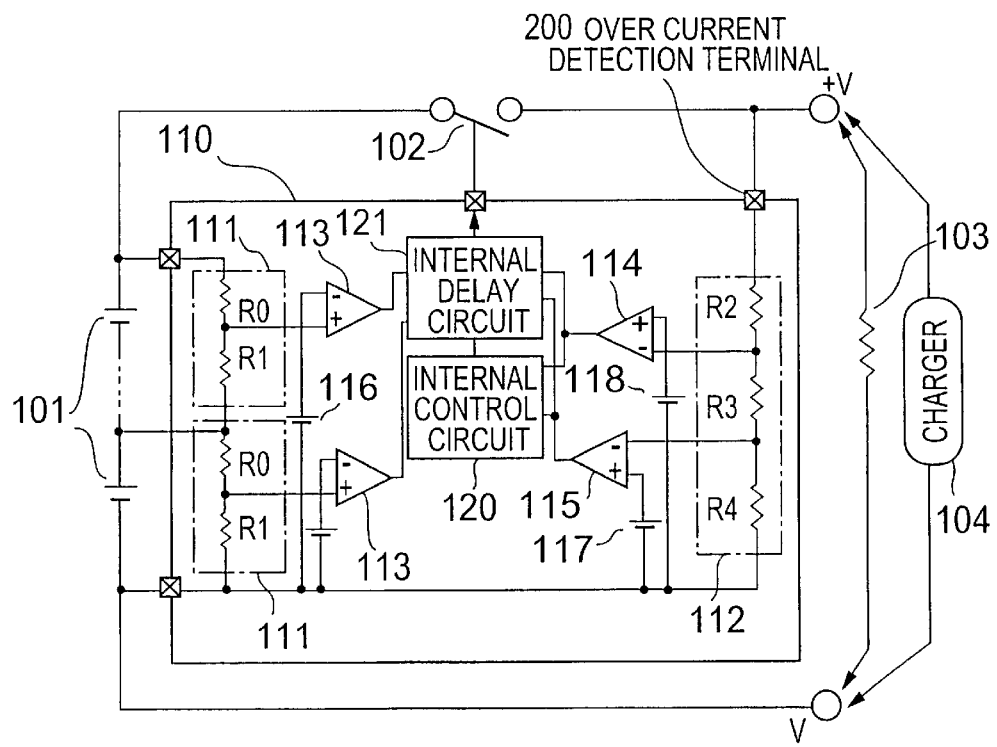
FIG. 4 is an explanatory diagram showing still another circuit block of the charging type power supply device in accordance with the present invention.
Figure 5:
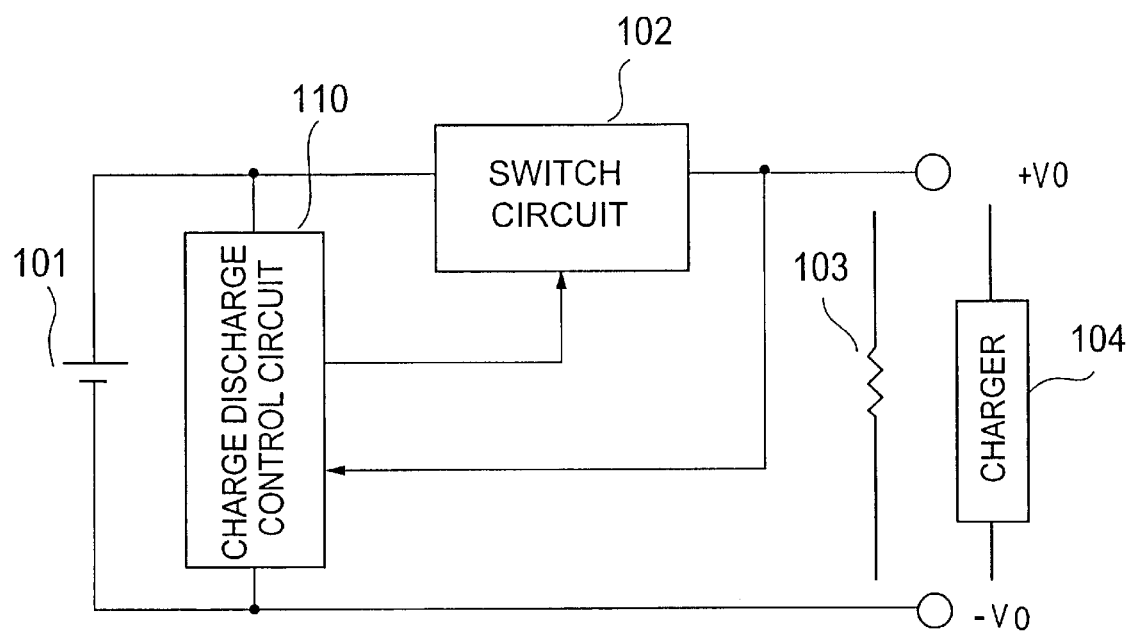
FIG. 5 is an explanatory diagram showing a circuit block of a conventional charging type power supply device.

The above description is given of only the over-charge, but the same circuit can be applied to the over-discharge. Also, the comparator is used as the voltage detecting means, but the same circuit can be structured even by the voltage detecting means for detecting a voltage by using a threshold voltage of the CMOS transistor. Also, the same circuit can be structured even in the case where a plurality of secondary batteries are connected in series as shown in FIG. 4.

As was described above, in the case where a voltage equal to or higher than a regulated voltage is applied to the charger connection terminal of the charging type power supply device, it can be entered the test mode for shortening the delay time of the internal control circuit, thereby being capable of shortening the test time and reducing the manufacturing costs. Also, in the case where the charger with the abnormal voltage is connected, the delay time can be shortened to protect the secondary battery, thereby being capable of preventing an excessive voltage from being applied to the secondary battery for a long period of time.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A charging and discharging control circuit, comprising:
   over-charge voltage detecting means, over-discharge voltage detecting means or over-current voltage detecting means for a secondary battery;
   an internal control circuit that inputs and processes signals from said over-charge voltage detecting means, said over-discharge voltage detecting means or said over-current voltage detecting means and outputs a signal for controlling the charging and discharging operation; and
   a delay circuit that inputs the output of said control signal and outputs a signal after a constant delay time;
   wherein a delay time of said delay circuit is shortened when a voltage equal to or higher than a regulated voltage is applied to the charger connection terminal.

2. A charging and discharging control device, comprising:
   a secondary battery connected to an external power supply terminal through a switching circuit; and
   a charging and discharging control circuit for controlling said switching circuit, which includes over-charge voltage detecting means, over-discharge voltage detecting means or an over-current detecting circuit, an internal control circuit, a delay circuit and a current control switching circuit;
   wherein a delay time of said delay circuit is shortened when a voltage equal to or higher than a regulated voltage is applied to the charger connection terminal.

* * * * *